United States Patent [19]

Clarke et al.

[11] Patent Number: 4,860,709
[45] Date of Patent: Aug. 29, 1989

[54] ENGINE INDUCTION SYSTEM AND METHOD

[75] Inventors: James R. Clarke, Northville; Brian C. Wolfe, Canton, both of Mich.

[73] Assignee: Ford Motor Company, Dearborn, Mich.

[21] Appl. No.: 246,837

[22] Filed: Sep. 20, 1988

[51] Int. Cl.⁴ .............................................. F02M 35/10
[52] U.S. Cl. .................................... 123/432; 123/90.15
[58] Field of Search ............................... 123/432, 90.15

[56] References Cited

U.S. PATENT DOCUMENTS

| | | | |
|---|---|---|---|
| 1,212,478 | 1/1917 | Hall | 123/432 |
| 1,285,129 | 11/1918 | Goodrich | 123/432 |
| 1,512,311 | 10/1924 | Ricardo | 123/432 |
| 1,761,958 | 6/1930 | Anderson | 123/432 |
| 2,119,707 | 6/1938 | Funderburk | 123/432 |
| 4,192,265 | 3/1980 | Amano | 123/274 |
| 4,512,311 | 4/1985 | Sugiyama | 123/432 |
| 4,566,422 | 1/1986 | Tadokoro et al. | 123/432 |
| 4,576,131 | 3/1986 | Sugiyama | 123/432 |
| 4,641,620 | 2/1987 | Yoshimura | 123/432 |
| 4,660,529 | 4/1987 | Yoshikawa | 123/432 |
| 4,667,636 | 5/1987 | Oishi | 123/432 |
| 4,703,734 | 11/1987 | Aoyama et al. | 123/432 |
| 4,726,337 | 2/1988 | Yoshida | 123/432 |
| 4,727,719 | 3/1988 | Mizutani | 123/432 |

Primary Examiner—E. Rollins Cross
Attorney, Agent, or Firm—Clifford L. Sadler; Jerome R. Drouillard

[57] ABSTRACT

An engine induction system for reducing engine pumping losses provides for a minimum of two intake valves per cylinder, a primary and secondary, with valve port activation means associated with the secondary valves to control air flow to them so that at light loads only air flows through the primary intake valves, the secondary valves providing air flow at heavier loads, the primary intake valve openings being controlled so that no more than one primary valve is open at any one time; i.e., there is no overlap in openings between primary intake valves, which produces pumping losses at light loads when intake manifold vacuum is high.

11 Claims, 3 Drawing Sheets

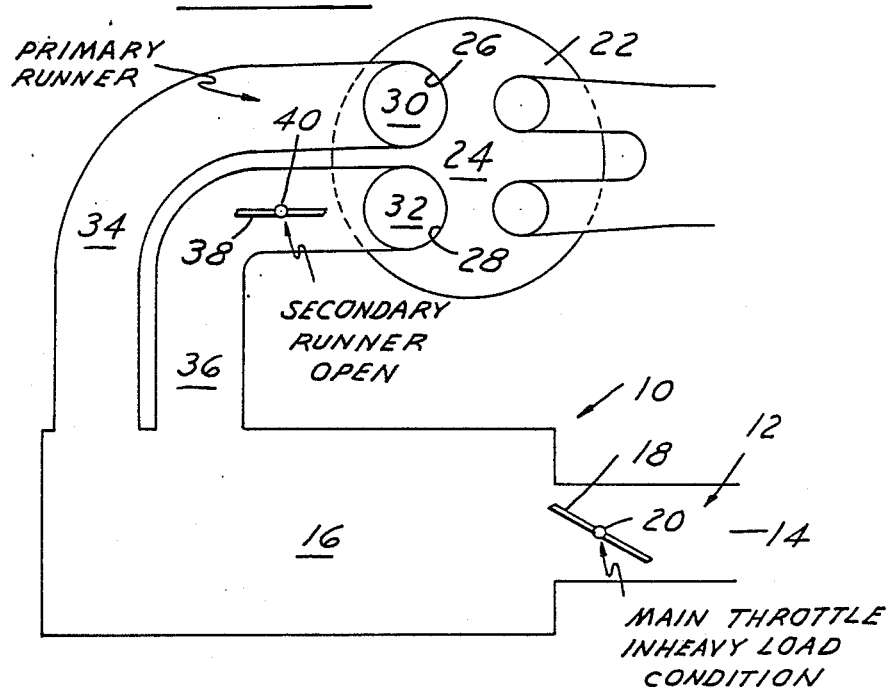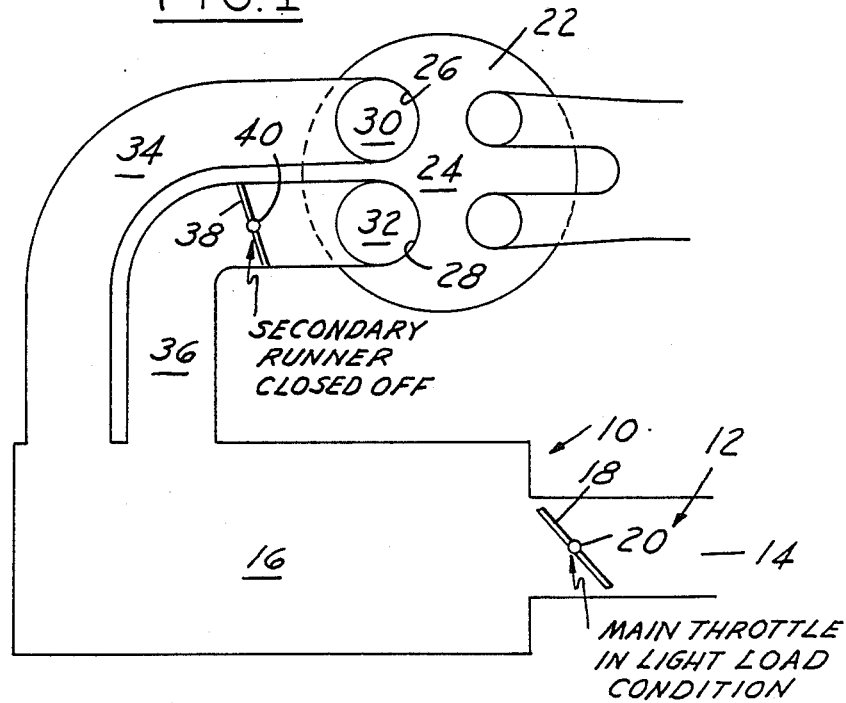

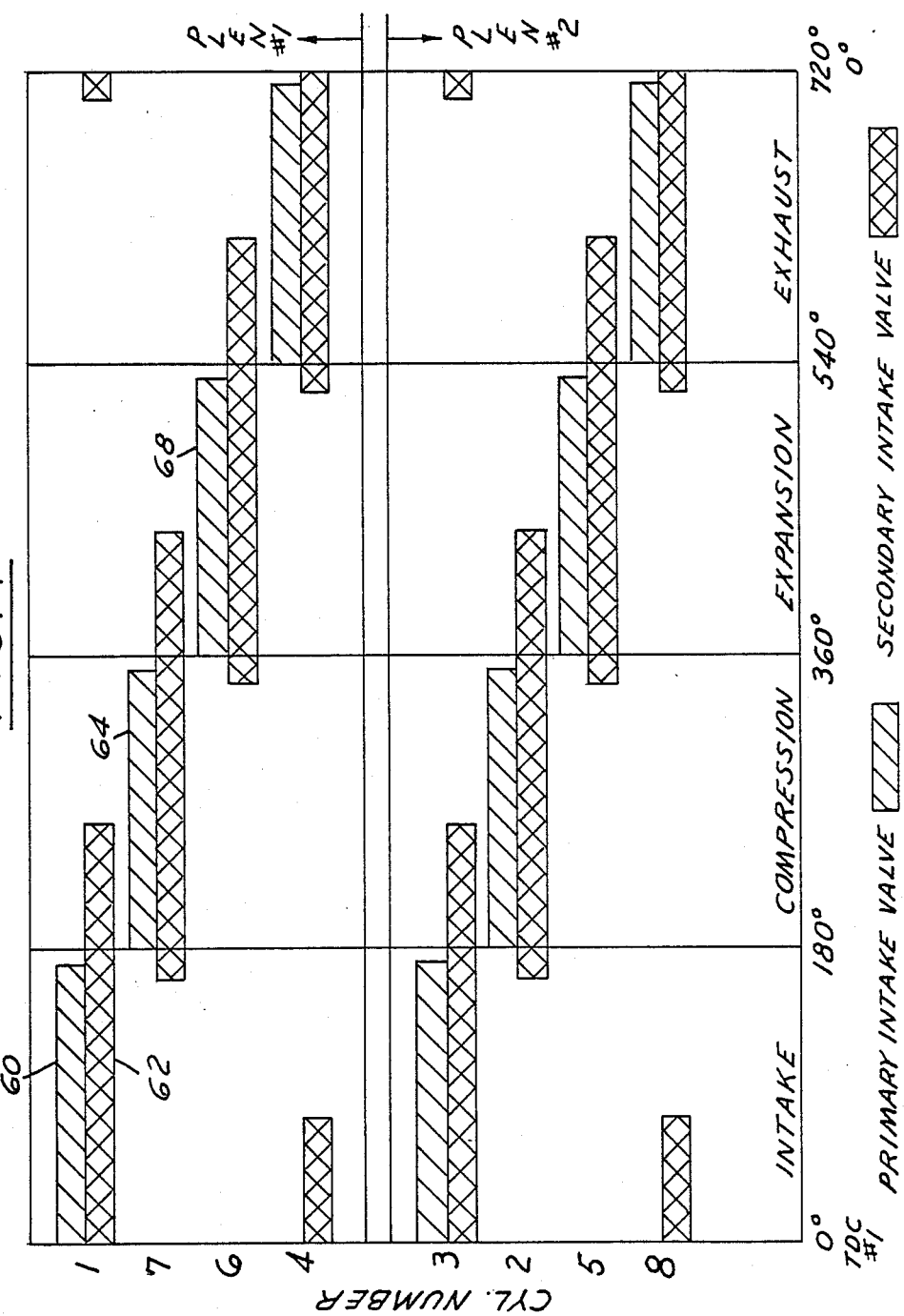

ENGINE INDUCTION SYSTEM AND METHOD

This invention relates in general to an automotive type internal combustion engine, and more particularly, to a system and method for inducting an air/fuel charge into the engine cylinders in a manner to prevent or minimize engine pumping losses.

In the conventional engine, if more than one intake valve is opened at any one particular time, the cylinder of the later opening valve must overcome the high suction, 15 inches Hg., for example, of the cylinder containing the first opened intake valve during the intake charge to the other cylinder. This results in an inefficient pumping loss and a lowering of the fuel economy.

This invention provides a system and method of inducting air to the engine that reduces or minimizes the engine pumping losses during light load operation when the losses are the greatest, and yet provides for greater power output at heavier engine loads.

The invention consists of an induction system for an engine having a plurality of cylinders each of which contains at least one primary and one secondary intake valve, along with the necessary exhaust valving. A single plenum is provided for the main intake of air, with a main throttle valve controlling the flow to the plenum. The outflow of air from the plenum is made to each individual cylinder intake valve by individual manifold runners. The primary runner to each primary intake valve is open at all times, whereas to the plenum secondary runner contains a throttle valve for variably closing or opening the runner and thereby variably controlling the flow of air to the secondary intake valve. The timing of opening of the intake valves of different cylinders is such that only one primary intake valve is open at any one time, with no overlap between primary intake valves, so that no cylinder is forced to overcome the high suction prevalent in another cylinder at that time. At light engine loads, only the primary intake valves receive air flow; whereas at heavier loads, the throttle valve for the secondary runners is progressively opened to supply air to the secondary valve to obtain greater power output to the engine.

Constructions to minimize engine pumping losses are known. For example, Hall, U.S. Pat. No. 1,212,478, shows an eight-cylinder engine construction divided into two banks to in effect constitute two plenums, each providing four cylinders. Hall states that there is no overlapping of the valves in the four-cylinder engine. Therefore, the assumption is that only one cylinder draws at one time on one side of the dividing wall, which prevents any one cylinder from robbing another cylinder of a proper supply of gas.

Goodrich, U.S. Pat. No 1,285,129, Funderburk, U.S. Pat. No. 2,119,707, Ricardo, U.S. Pat. No. 1,512,311, Anderson, U.S. Pat. No. 1,761,958, and Bruderlin, U.S. Pat. No. 3,800,752, all show the use of dual plenums in which succeeding cylinders are not adjacent one another; i.e., the cylinders in the engine firing order alternate between plenums so that not more than one intake valve of one plenum is open at any one particular time.

It should be noted that the above constructions all are for one-intake-valve-per-cylinder constructions and that the total charge taken into each intake valve, therefore, is a maximum as a function of the main throttle valve controlling the flow of air to the manifold. There is no secondary intake valve providing a greater power output to the engine when such a demand is called for, as in the case in the invention.

None of the references shows a multi-intake valve per cylinder construction wherein light loads are controlled by inducting air only through the primary intake valve with no overlap of openings between intake valves, and wherein, for heavier loads, air to secondary intake valves is provided concurrently to supply more air to the engine to provide the power called for.

It is a primary object of the invention, therefore, to provide an internal combustion engine construction that minimizes engine pumping losses while providing for the supply of extra air to the engine when necessary to provide additional power.

It is another object of the invention to provide an engine construction having a plurality of intake valves per cylinder with individual manifold runners connecting each of the intake valves to a central plenum into which air is inducted past a main throttle valve controlled by the vehicle operator, and in which secondary runners contain additional throttle valves for variably controlling the flow of air to the secondary intake valves as a function of load demand to minimize engine pumping losses at light load operation while supplying additional air to the cylinders for heavier load operation.

It is a still further object of the invention to provide a method of inducting air into the engine and a system for inducting such air that provides a more efficiently operating engine.

Other objects, features and advantages of the invention will become more apparent upon reference to the succeeding, detailed description thereof, and to the drawings illustrating the preferred embodiment thereof wherein:

FIG. 1 is a schematic illustration of an engine induction system embodying the invention;

FIG. 1A is a view similar to FIG. 1 illustrating the parts thereof in a different operative position;

Figure 3:
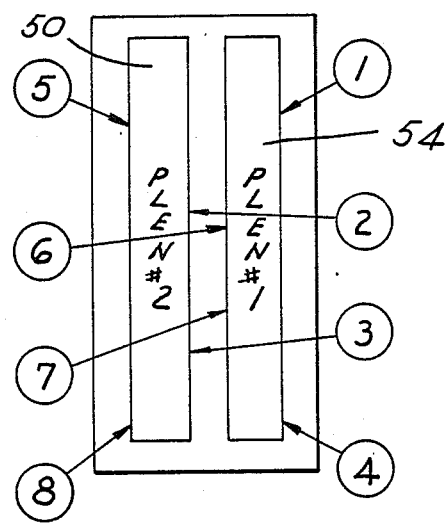
Figure 2:
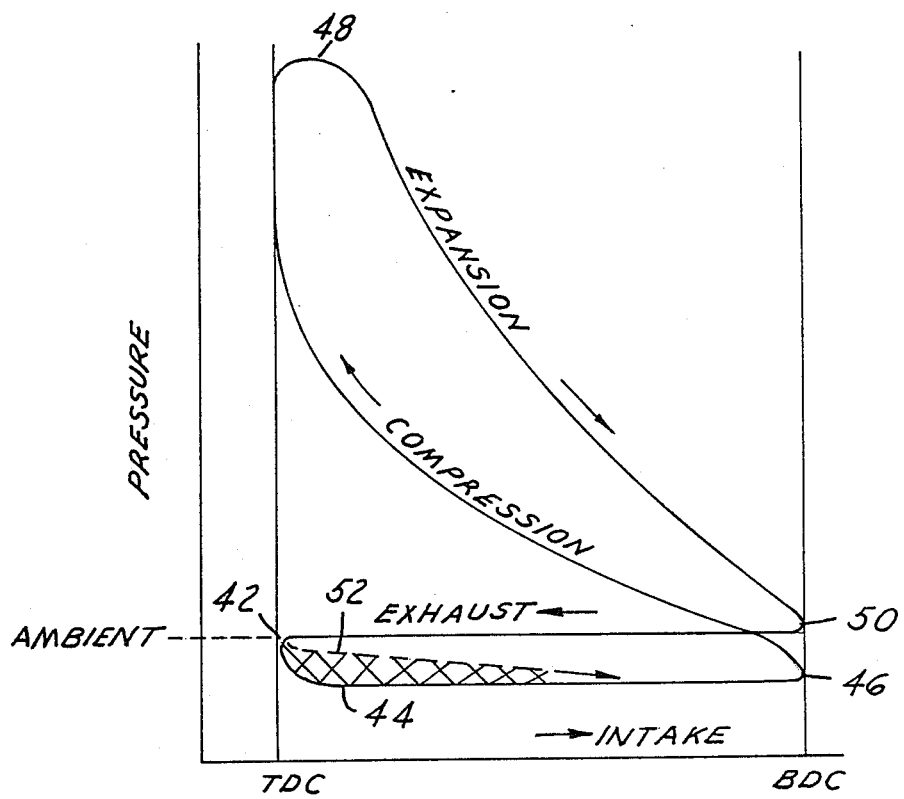

FIG. 2 graphically illustrates the operation of a four-cycle internal combustion engine, wherein pressure change is plotted versus cranking of the engine piston;

FIG. 3 is a schematic representation of a dual induction system of the engine embodying the invention; and FIG. 4 graphically illustrates the duration of opening of the primary and secondary intake valves for each cylinder of the engine.

FIG. 1 portrays a portion 10 of an internal combustion engine having an induction passage 12 opened at one end 14 to ambient air from, for example, a conventional engine air cleaner, not shown. The lower portion of passage 12 opens out into a plenum or intake manifold 16, the flow into it being controlled by a main throttle valve 18. The latter is fixed on a shaft 20 that is rotatably mounted in the walls of the passage 12 to control the flow of air through passage 12 by movement between the closed or engine idle speed position shown through a part throttle opening position to a wide open essentially horizontal position.

The engine in this case would contain a number of similar cylinders, only one being indicated for clarity. A cylinder head 22 defines with the piston, not indicated, a combustion chamber 24 into which a charge of fuel and air is supplied. In this case, each cylinder head has a pair of inlet valve port openings 26, 28 into which are fitted a primary intake valve 30 and a secondary intake valve 32. The port openings 26, 28 are connected by individual intake manifold runners 34, 36 to the plenum 16, as shown. The primary runner 34 is open at all times to communication with plenum 16, whereas, in this case, the secondary runner 36 contains a secondary throttle valve 38. The latter is fixed to a shaft 40 rotatably mounted in the walls of the runner for variably opening and closing the runner to variably control the flow of air to the secondary intake port 28.

As thus far described, it will be seen that upon opening of main throttle valve 18, air will be inducted into plenum 16 by the downward motion of the piston in the engine cylinders so that air also is inducted into the main or primary runner 34 and through an open primary intake valve 30 into the cylinder combustion chamber. Although the secondary intake valve 32 also will be open at this time, air will be inducted into secondary intake port 28 only as a function of the opening of the secondary throttle valve 38. With valve 38 closed, all of the air inducted will be through the primary runner 34.

FIG. 1 illustrates operation of the engine during light loads. At this time the engine pumping losses are the greatest since the vacuum level in the manifold generally is highest at this time. In accordance with the invention, as stated previously, therefore, it is desired that only one intake valve be opened at a time to prevent the engine pumping losses described previously. FIG. 1A illustrates the induction system during heavier load operation wherein main throttle valve 18 is opened to beyond its light load position. At this point, the secondary throttle valve 38 is opened to permit air flow into the secondary intake port 28 to supply additional air necessary at this time for greater power output. At the heavier engine loads, the vacuum in the intake manifold is approaching atmospheric pressure conditions; therefore, the pumping losses at this time are essentially minimal and several intake valves of different cylinder can be opened at the same time, incurring only minimal pumping losses. That is, an overlap could occur between the opening of the intake valve of one cylinder and the intake valve of another cylinder because the manifold vacuum has decayed and, therefore, the pumping losses would be low.

FIG. 2 illustrates an essentially conventional loop operating diagram of an engine as compared with one representative of the engine operating as constructed by this invention. That is, the conventional engine with normally overlapping intake port openings begins its operation at top dead center position of the piston at point 42, proceeds downwardly during its intake stroke along the curve 44 towards bottom dead center position of the piston at point 46, with the pressure slightly below atmospheric. At this point, the piston starts rising during its compression stroke raising the pressure as indicated in FIG. 2 above atmospheric or ambient until it reaches a maximum at point 48 whereupon ignition occurs and the charge in the engine cylinder is ignited. The piston then continues down during its expansion stroke toward the bottom dead center position again to the point 50 wherein atmospheric pressure level is reached and the exhaust valve opens. At this point, the piston continues back up towards the top dead center position during the exhaust stroke with essentially atmospheric or ambient pressure conditions prevailing to return to the starting point 42.

As stated previously, in a conventional engine with more than one intake valve open at any one time, the later opening intake valve cylinder must work against the suction of the previously opened intake valve cylinder indicated by the curve 44. In the invention of this application, at light loads, when only the primary intake valve passage is open for one cylinder, and no overlap between primary intake valves of other cylinders, the pressure will be very close to ambient or atmospheric as indicated by the dotted line curve 52 starting at the point 42. As the induction increases during the downward stroke of the piston toward the maximum volume position 46, the intake manifold vacuum also gradually increases. The graph clearly illustrates in the cross-hatched section between curves 44 and 52, the amount of pumping losses saved by the invention by reducing the intake manifold vacuum normally prevalent at the beginning of the intake stroke.

As stated previously, the invention necessitates having no more than one primary intake valve open at any one time during light loads where all of the valves are connected to a single plenum. This is suitable for an engine with four or less cylinders. However, for an eight or six cylinder engine, a plurality of plenums would be necessary. In the latter case, as seen in FIG. 3, two plenums 54, 56 would be used, with each being connected to four cylinders of the engine. A normal firing order would be cylinders 1, 3, 7, 2, 6, 5, 4 and 8, which will be seen to assure that not more than one primary intake valve of one plenum is open at any one particular time.

FIG. 4 illustrates the control timing for the intake valves of each cylinder with respect to each other to provide for minimal pumping losses at light engine loads and yet greater air flow for greater power at the heavier engine loads. More specifically, FIG. 4 shows a valve plot of cylinder number versus engine crank angle with the bar 60 indicating the duration of opening of the primary intake valve for the particular engine cylinder associated therewith, and bar 62 indicating the opening duration of the secondary intake valve associated with that same engine cylinder. The mechanism for opening and closing the engine valves in this case causes both primary and secondary intake valves of a particular cylinder to be opened at the same time, the flow of air to the secondary valve ports 28, however, being controlled in this case by the secondary runner throttle valve 38.

The operation as exemplified by FIG. 4 is as follows. During light load operation, as seen in FIG. 1, secondary throttle valve 38 will be closed. Therefore, as the piston begins moving downwardly from its top dead center position seen in FIG. 4, both intake valves 30 and 32 are opened as indicated by the bar graph 60, 62. The flow of air to the secondary intake port 28, however, is prevented by the closed throttle valve 38. At light load conditions, therefore, to avoid opening of more than one primary intake valve at any one time, the primary intake valve 60 remains opened until the piston reaches just short of the 180° crank angle position, at which time it closes. This occurs some degrees before the opening of the primary intake valve 30 of the next cylinder, in this case cylinder 7, in succession of firing order, as indicated by the bar graph 64. The intake valve associated with cylinder 7 then closes just prior to the piston attaining the top dead center position for a 360° crank angle rotation and prior to the opening of the intake valve for cylinder six, as indicated by the bar graph 68. The same opening duration and closing occurs again for cylinder four, as clearly indicated at FIG. 4.

It will be seen, therefore, that only one primary intake valve of each plenum is open at any one particular time during light load operation with no overlap of openings between the primary intake valves of different cylinders. The secondary intake valves 32 also are open, but no air is supplied to that port because the secondary throttle valves 38 are closed.

As the load increases, the main throttle valve 18 will be rotated more open to provide a greater supply of air to the engine cylinders. Simultaneous with the rotation of the main throttle valve, the secondary throttle valve 38 also will begin to move to an open position to admit air into the open secondary intake valve 28. This is illustrated graphically in FIG. 4 by the bar graph 62. Since greater power calls for a demand for a greater supply of air, in this case, there is Provided an overlap of openings between the secondary intake valve of one cylinder and the primary intake valve and secondary intake valve of the next succeeding cylinder in succession of firing order. This is permissible because the manifold vacuum level is low and, therefore, the pumping losses will be low.

The amount of air directed to the secondary intake port will of course be in proportion to the load and the degree of opening of the main throttle valve, by means not shown. By a study of FIG. 4, therefore, it will be seen that the secondary intake valves all may be opened earlier than closing of the previous primary intake valve in the firing order and stay open longer than their associated primary intake valve and are open when the next primary intake valve in succession opens, so as to provide the overlap necessary to supply enough air fuel charge into the cylinder to attain the necessary power demanded.

From the foregoing, therefore, it will be seen that an engine induction system construction is provided that minimizes engine pumping losses during light load operation by the supply of air through primary intake valves alone without overlapping of intake valve openings between different cylinders, while at the same time providing secondary intake valves for each cylinder, the air flow to which is controlled as a function of load to supply additional air when necessary to the engine to provide additional power demanded for heavier load operating conditions, the secondary intake valve openings overlapping with those of its associated primary intake valve as well as the primary intake valve openings of the other cylinders to provide the necessary volume of air demanded.

While the invention has been shown and described in its preferred embodiment, it will be clear to those skilled in the arts to which it pertains that many changes and modifications may be made thereto without departing from the scope of the invention.

What is claimed:

1. A method of inducting air into the intake of an internal combustion engine to reduce engine pumping losses, the engine having an intake plenum connected to a plurality of cylinders each having at least one primary and one secondary intake valve, comprising the steps of: first, blocking the flow of air to the secondary valves; second, opening each primary intake valve one at a time and closing that valve prior to the opening of the primary intake valve of any other cylinder thereby precluding overlap between the openings of primary valves of different cylinders; and third, at heavier loads, unblocking the flow of air to the secondary valves to obtain greater air flow.

2. A method of inducting air into the intake of an internal combustion engine to reduce engine pumping losses, the engine having a plurality of cylinders each with at least one primary and one secondary intake valve, comprising the steps of, opening one primary intake valve of one cylinder and closing that primary valve before the primary intake valve of any other cylinder is opened, and variably controlling the flow of air to the secondary valve of that cylinder as a function of engine load.

3. A method as in claim 2 including the step of maintaining the opening of the secondary valves to overlap with an opening of the primary valve of the next cylinder in sequence of engine firing order to provide additional air to the cylinders at the heavier engine loads.

4. A method as in claim 2, including the steps of closing the flow of air to the secondary valve during engine light load operation and progressively opening the air intake to the secondary intake valve as a function of increasing engine load.

5. A method as in claim 4, including the step of associating a throttle valve with the air intake to each secondary intake valve for throttling the intake of air to that valve.

6. A method as in claim 4, including the step of opening the secondary intake valve of that cylinder before opening the primary valve of that cylinder and prior to the closing of the primary intake valve of the preceeding cylinder in engine firing order sequence to provide overlap of openings between the valves for greater engine power operation.

7. A method of inducting a charge of air into an automotive type internal combustion engine having an intake manifold plenum with individual primary and secondary manifold runners connected therefrom to individual cylinders, each of the cylinders having at least primary and secondary intake valves, connected respectively to the primary and secondary runners comprising the steps of, closing the secondary runners during engine light load operation while throttling the main intake of air into the plenum, opening only one primary intake valve of one cylinder at one time for the intake of air to that cylinder and closing that primary intake valve of the one cylinder prior to opening the primary intake valve of the next cylinder in the engine firing order sequence and progressively opening the secondary runner connected to the one cylinder concurrent with the opening of the primary valve of that one cylinder in response to less throttling of the air to the plenum indicative of heavy engine load conditions, and delaying the closing of the secondary intake valve of the one cylinder beyond the opening of the primary intake valve of the next cylinder in the sequence of engine firing order to provide an overlap of air intake between the two to provide a greater power output responsive to the heavier load demand.

8. An induction system for a multi-cylinder internal combustion engine with more than one intake valve per cylinder, the engine having an intake manifold plenum for the intake of air to the cylinders, the plenum having an ambient air inlet and outlets, an air induction passage connected to the inlet and containing a main driver operated throttle valve movably mounted in the passage from a closed passage position to part throttling and wide open passage positions to control flow of ambient air into the plenum, each engine cylinder having at least one primary and one secondary intake valve movably mounted with respect thereto to control the intake of air into the cylinder, each cylinder having a pair of individual primary and secondary intake manifold runners connected at one end to outlets of the plenum and at their other ends to their respective intake valves, and means to deactivate the flow throughs the secondary valve to control air flow therethrough, the opening and closing of the primary intake valves of all the cylinders being scheduled in sequence with respect to each other so that only one primary intake valve of all the cylinders associated with the plenum is open at any one time thereby reducing engine pumping losses with no overlap between the opening of the primary intake valve of one cylinder and the the primary intake valves of the different cylinders, the flow through the secondary valves being controlled concurrent with the opening of the primary valve, the secondary runners all being deactivated during the part throttle light load operating position of the main throttle valve, the wide open and heavier load position of the main throttle valve effecting an actuation of the secondary runners associated with the said one intake valve approximately concurrent with the opening of the one primary valve and a closing of the latter secondary valve progressively later than the closing of the primary valve and later than the opening of the primary valve of the next cylinder in engine firing order sequence, as a function of the engine load, to provide an overlap of intake valve openings at higher loads thereby providing greater intake of an air/fuel charge to the cylinders and a consequential greater power output at the higher loads.

9. An induction system as in claim 8, wherein the primary intake valves of all the cylinders are opened and closed one at a time with no overlap at any time of openings between primary valves of different cylinders.

10. An induction system as in claim 8, including a second plenum when the number of the engine cylinders is in excess of four, with no interconnection of air between plenums, and including individual manifold runners from each of the plenums to the individual cylinders.

11. An induction system as in claim 7, wherein the secondary intake valve of the one cylinder is opened upon the attainment of a predetermined load level prior to the opening of the primary intake valve of the one cylinder and prior to the closing of the primary intake valve of the preceding cylinder in sequence of engine firing order.

* * * * *